Sept. 13, 1932.    P. J. FOBERT ET AL    1,876,900
MACHINE FOR TRIMMING BEARINGS OR THE LIKE
Filed Aug. 16, 1930    2 Sheets-Sheet 1

INVENTOR
Phillip J. Fobert &
BY  Adrian J. Ducharme
ATTORNEYS.
Barnes & Kisselle

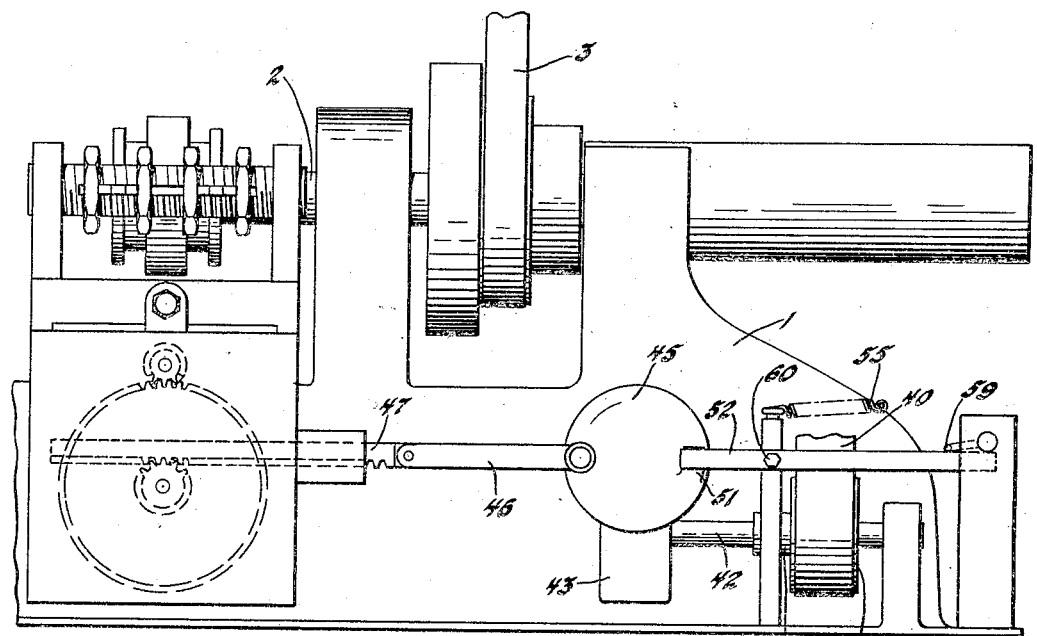

Patented Sept. 13, 1932

1,876,900

UNITED STATES PATENT OFFICE

PHILLIP J. FOBERT AND ADRIEN J. DUCHARME, OF DETROIT, MICHIGAN, ASSIGNORS TO DETROIT ALUMINUM & BRASS COMPANY, OF DETROIT, MICHIGAN, A CORPORATION OF MICHIGAN

MACHINE FOR TRIMMING BEARINGS OR THE LIKE

Application filed August 16, 1930. Serial No. 475,672.

This invention has to do with a machine useful for finishing or otherwise trimming articles such as bearings. The principal object of the invention is the provision of a machine wherein a multiplicity of operations are performed substantially at the same time, some of which may be in an automatic manner.

The machine, while being useful for performing operations on bearings, is obviously not limited to use with bearings but for the purpose of simplifying the disclosure the machine will be described with reference to bearings.

Fig. 3 is a more or less diagrammatic view illustrating the operating mechanism.

Fig. 4 is a detail in section illustrating the tools in their application upon the bearing.

Fig. 5 is a detail view showing one tool and its manner of mounting.

Figure 1:
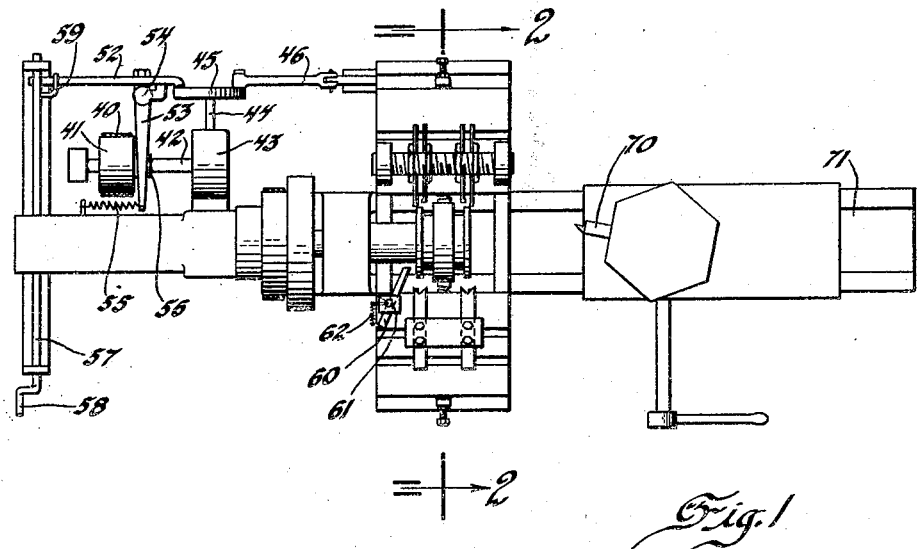
Fig. 1 is a top plan view of a machine constructed in accordance with the invention illustrating the arrangement of several tools for acting upon a bearing.

The machine takes the general form of a lathe having a supporting framework 1, an arbor 2 rotatable as by means of belt 3 running over pulley as shown. This arbor has an arrangement, as at 4, designed to receive a bearing. The bearing is a cylindrical shape having facing metal 5 usually of babbitt, and a backing 6 which may be and usually is brass or bronze or steel. We are speaking of a more or less conventional type of bearing, and of course the metals may vary. A clamp 7 may be placed around the bearing or bearing half to hold it in place during the time it is being acted upon.

As shown in Fig. 4 there are sets of cutting tools advantageously positioned on opposite sides of the arbor for acting upon the bearing. One set comprises tools 10 and 10a for trimming the outer faces, and tools 11 and 11a for trimming the inner faces. Opposite these tools is a set of cutting tools comprising 12 and 12a which trim the outer edges of the babbitt inwardly radially shaping the same as illustrated at 15; and tools 13 and 13a which bevel the edges of the flanges 16 of the backing.

The sets of tools are mounted in suitable holders or supports 20 and 21. An advantageous arrangement is to mount the holders so that they can be adjusted. The holder 20 is mounted upon a block 22 in a groove 23 so that it can be adjusted in an axial direction as regards the arbor in any well known manner. The block 22 is carried by a member 23 held thereon by means of screws 24. An adjusting screw 25 contracts with the block 22, the same being screw threaded in a bracket 26 for adjusting the block 22 perpendicular to the arbor axis, and the adjustment may be maintained by a lock nut 27.

There is a bracket 30 which extends underneath the arbor to either side thereof, and journaled in the bracket is a screw shaft 31 provided with screw threads 32 passing through a screw threaded lug 33 on one of the supporting members 23, and other screw threads 34 screw threaded into lug 35 of the other supporting member. It will be noted that these screw threads are of different pitches, and as the shaft is rotated the tool supporting devices are reciprocated.

The screw shaft is rotated through suitable means as shown in Figs. 1 and 3; the means comprises, in the present instance, of a driving belt 40 running over pulley 41 mounted on shaft 42 which extends into a gear box 43 from which shaft 44 projects carrying a wheel element 45.

A crank 46 is mounted upon the wheel 45 and has a jointed connection with a rack 47. Rack 47 (Fig. 2) meshes with a gear 48 mounted on the same shaft with a larger gear 49 which in turn meshes with a pinion 50 on the shaft 31. It is desired that one cycle of operation consists of one revolution of the wheel 45, and accordingly a clutch is provided which is automatically thrown out at the end of each cycle. For this purpose there is a cam element 51 on the wheel 45 designed to engage and rock an arm 52 connected to an arm 53 (Fig. 1) and which pivots around point 54. A spring 55 acts upon arm 53 and holds the clutch 56 engaged. Accordingly, each time the cam 45 rides in under the end of the arm 52 the same is rocked together with arm 53 against action of spring 55 releasing the clutch. To manually reengage the clutch there is provided a rock shaft 57 provided with a handle 58 having a projecting piece 59 which engages the arm 52. By manually rocking the shaft 57 the piece 59 rocks the arm 52 around point 60 (Fig. 3) thus disengaging it from the cam element 51 permitting the spring 55 to reengage the clutch.

Figure 2:
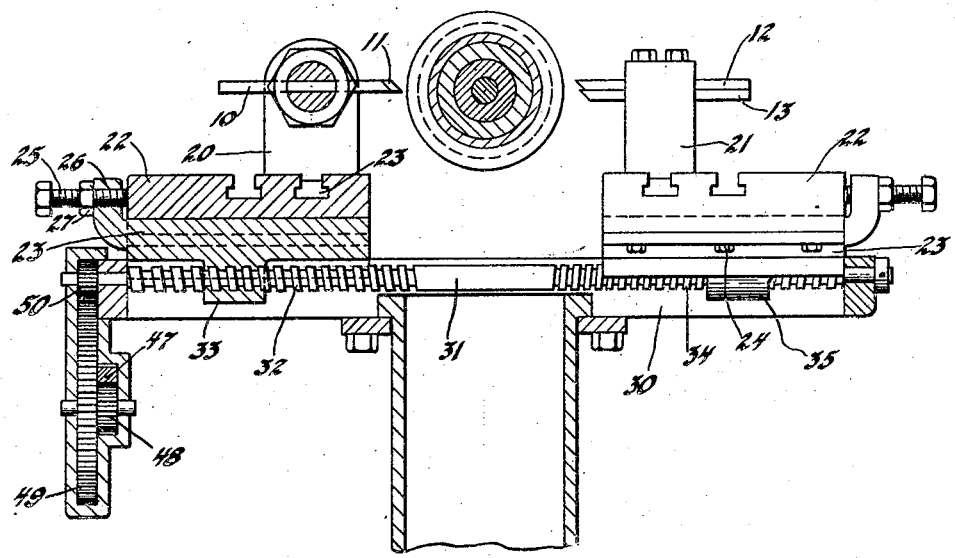
Fig. 2 is an enlarged section taken substantially on line 2—2 of Fig. 1.

A cycle of operation is as follows:

The machine being at rest with the parts positioned substantially as shown in Figs. 1 and 2 with the bearing in place upon the rotating arbor 2 the operator rocks the shaft 57 resulting in engagement of clutch 56. The wheel element 45 now makes one revolution until the cam again throws out the clutch. The rack 47 reciprocates first in one direction then back. During this time the shaft 31 is rotated to first feed the tools inwardly so that they act upon the bearing and then back to normal open position. In this regard the tools move at different rates of speed due to the different screw pitches so that the desired timing action is obtained. Due to the larger pitch of screw 32 the tools 10, 10a and 11, 11a move in and dress the inner and outer sides of the flanges 16, and while the tools are substantially innermost as shown in Fig. 4, this dressing operation is followed by the cutting of the groove 15 and the beveling of the edges by the tools 12, 12a and 13, 13a. As the shaft 31 reverses the tools 12, 12a and 13, 13a are first to recede from their respective surfaces not because of a higher rate of speed but because they do not move in so far. Then following this the tools 10 and 11 are retracted with the result that the tools 10 and 10a remove any burr which may be thrown up by the tools 12 and 12a. The same is true of tools 11 and 11a removing any burr which may be thrown up by the tools 13 and 13a. Upon the completion of a cycle the operator places a new bearing on the arbor and then the operation is performed over again.

The inner edges of the babbitt material is also trimmed and dressed, and at least one edge is dressed simultaneously in the above described cycle. This is accomplished by a cutting tool 60, which as shown in Figs. 1 and 5, is pivotally mounted as at 61 and acted upon by spring 62. One end of this spring is connected to a fixed pin 63 and the other end of a pin 64 which may extend through the pivot point 61 so that the tool 60 and pin 64 rock in unison. As the dressing tools move inwardly toward the bearing so does the tool 60, as it is mounted upon block 22 and it has a more or less beveled or rounded end 65 which contacts with the arbor, and upon further movement the tool is rocked by a cam action between the arbor and the end of the tool against the action of the spring 62. The cutting edge 66 accordingly moves and bevels an inner edge of the bearing, as illustrated in Fig. 4. In the latter half of the cycle the tool 60 returns to its normal position, shown in Figs. 1 and 5. Thus a multiplicity of dressing operations are performed. To bevel the other inner edge of the bearing there is a tool 70 reciprocably mounted upon guideway 71 which may be now manually moved by the operator to bevel the opposite inward edge, thus completing the treatments of the bearing.

It may be here mentioned that heretofore it was necessary for an operator of a machine to reverse the bearing on the arbor in order to bevel both inner edges. In other words, a tool 70 was employed to bevel an inner edge of the bearing, and then after this was accomplished the bearing would have to be removed from the arbor, replaced thereon in reverse position and then the other inner edge beveled by moving in tool 70. This of course represented a good deal of labor time. Accordingly, it will be noted that in the present apparatus the bearing need be placed on the arbor only once, and in one operation several dressing operations are performed including the bevel of one inner edge, and then the other inner edge can be beveled without removing the bearing from the arbor.

We claim:

1. A device for trimming the inner edge of a bearing, comprising in combination an arbor for holding the bearing, said arbor having a portion the diameter of which is less than the inner diameter of the bearing, a cutting tool, means mounting the cutting tool to move the same in toward the arbor, said cutting tool having a surface for engaging the arbor for camming the same into cutting relation as regards an inner edge of the bearing.

2. A machine for performing a cutting operation upon a bearing or the like, comprising a rotatable arbor for holding the bearing and having a portion the diameter of which is less than the interior diameter of the bearing, a pivotally mounted cutting tool, means for moving the cutting tool into engagement with the arbor whereupon continued movement of the tool is cammed by the arbor and moved around its pivot point into cutting relation with an inner edge of the bearing.

3. A machine for performing a cutting operation upon a bearing or the like, comprising a rotatable arbor for holding the bearing and having a portion the diameter of which is less than the interior diameter of the bearing, a pivotally mounted cutting tool, means for moving the cutting tool into engagement with the arbor whereupon continued movement of the tool is cammed by the arbor and moved around its pivot point into cutting relation with an inner edge of the bearing, and means for holding the tool normally out of cutting relation as regards the inner edge of the bearing.

4. A machine for performing trimming operations upon a bearing or the like, comprising a rotatable arbor for holding the bearing having a portion the diameter of which is less than the interior diameter of the bearing, a movable supporting block, a pivotally mounted tool on the block having a cutting face, spring means for holding said cutting face removed in an axial direction from the bearing, said tool having a surface for engagement with the arbor, and means for moving the block toward the bearing whereby said surface of the tool engages the arbor and cams the same against action of the spring into cutting relation as regards an inner edge of the bearing.

5. A machine for trimming a bearing or the like, comprising in combination a rotatable arbor for supporting the bearing, a support on each side of the arbor, means for moving the supports radially toward and away from the arbor, cutting tools carried by the supports for cutting faces of the bearing, a cutting tool shiftable axially as regards the arbor and movable into cutting relation with an inner edge of the bearing, another cutting tool for cutting the opposite inner edge of the bearing located inwardly of the end of the arbor, means movably mounting said last named tool on one of the supports, said last named tool being moved upon its movable mounting when the support upon which it is carried moves toward the arbor whereby said tool is moved into cutting relation as regards said opposite inner edge of the bearing.

6. A machine for trimming bearings or the like comprising a rotatable arbor for supporting a bearing with one end of the bearing projecting beyond the end of the arbor, an axially movable cutting instrument for cutting the inner peripheral edge of the bearing projecting beyond the arbor, a tool support on each side of the arbor, cutting tools carried thereby, means for moving the support toward and away from the arbor so that the cutting tools act upon the bearing, another cutting tool pivotally mounted on one of the supports having a cutting edge axially removed from the end of the bearing inwardly of the end of the arbor, said last named cutting tool being swung on its pivotal mounting as the support upon which it is mounted moves toward the arbor whereby its cutting edge moves axially toward the bearing and into cutting relation with the inner peripheral edge of the bearing located inwardly of the end of the arbor.

7. A machine for trimming bearings or the like comprising a rotatable arbor for supporting a bearing with one end of the bearing projecting beyond the end of the arbor, an axially movable cutting instrument for cutting the inner peripheral edge of the bearing projecting beyond the arbor, a tool support on each side of the arbor, cutting tools carried thereby, means for moving the supports toward and away from the arbor so that the cutting tools act upon the bearing, another cutting tool pivotally mounted on one of the supports having a cutting edge axially removed from the end of the bearing inwardly of the end of the arbor, said last named cutting tool being swung on its pivotal mounting as the support upon which it is mounted moves toward the arbor whereby its cutting edge moves axially toward the bearing and into cutting relation with the inner peripheral edge of the bearing located inwardly of the end of the arbor, said arbor inwardly of its end being of reduced diameter to permit the last mentioned tool to enter between the arbor and the said peripheral edge of the bearing.

In testimony whereof we affix our signatures.

PHILLIP J. FOBERT.
ADRIEN J. DUCHARME.